United States Patent
Honjo et al.

(10) Patent No.: US 6,803,414 B2
(45) Date of Patent: Oct. 12, 2004

(54) DAMPING RESIN COMPOSITION AND DAMPING RESIN ARTICLE FOR STRUCTURE USING THE RESIN COMPOSITION

(75) Inventors: Takeshi Honjo, Yokohama (JP); Harushige Yamamura, Yokohama (JP); Tai Uruji, Fuchu (JP); Masayoshi Yamaguchi, Yokohama (JP); Yusuke Koizumi, Chiyoda-ku (JP); Hiroshi Hayashi, Chiyoda-ku (JP)

(73) Assignee: Mitsubishi Fuso Truck and Bus Corporation, Tokyo (JP)

( * ) Notice: Subject to any disclaimer, the term of this patent is extended or adjusted under 35 U.S.C. 154(b) by 0 days.

(21) Appl. No.: 10/132,178

(22) Filed: Apr. 26, 2002

(65) Prior Publication Data

US 2002/0161138 A1 Oct. 31, 2002

Related U.S. Application Data

(62) Division of application No. 09/408,273, filed on Sep. 29, 1999, now abandoned.

(51) Int. Cl.[7] .............................. B32B 17/04; C08K 3/22; C08L 63/10; C08L 67/06
(52) U.S. Cl. ..................... 525/112; 428/297.4; 523/451; 523/457; 523/465; 523/466; 523/467; 523/468; 525/92 H; 525/168; 525/438; 525/445; 525/502; 525/531
(58) Field of Search .............................. 525/122, 532, 525/92 H, 112, 168, 438, 455, 502, 531; 428/297.4; 523/451, 457, 458, 465, 466, 467, 468

(56) References Cited

U.S. PATENT DOCUMENTS

| | | | |
|---|---|---|---|
| 4,192,685 A | | 3/1980 | Horike et al. ................ 522/107 |
| 4,414,367 A | * | 11/1983 | Gardner ....................... 525/531 |
| 4,508,785 A | * | 4/1985 | Cobbledick et al. ..... 428/424.4 |
| 4,777,195 A | * | 10/1988 | Hesse et al. ................. 523/461 |
| 4,910,270 A | * | 3/1990 | Maekawa et al. ............ 525/532 |
| 5,589,230 A | * | 12/1996 | Yamamura et al. ......... 427/493 |
| 5,869,557 A | * | 2/1999 | Landru et al. ............... 524/399 |
| 6,245,419 B1 | | 6/2001 | Hakotani et al. ............ 525/437 |

FOREIGN PATENT DOCUMENTS

| | | | |
|---|---|---|---|
| DE | 297436 A5 | | 1/1992 |
| JP | 55-039374 A | | 4/1975 |
| JP | 51-009189 A2 | | 1/1976 |
| JP | 55-149597 A | * | 11/1980 |
| JP | 58-187417 A | | 11/1983 |
| JP | 63-15864 A | * | 1/1988 |
| JP | 3-137158 A | | 6/1991 |
| JP | 3-137159 A | | 6/1991 |
| JP | 3-200822 A2 | | 9/1991 |
| JP | 5-170847 A | * | 7/1993 |
| JP | 8-301998 A | * | 11/1996 |

OTHER PUBLICATIONS

Cermak et al., "Photopolymer compounds with a higher degree of flexibility. I. Compounds," Sb. Ved. PR., Vys. Sk. Chemickotechnol. Pardubice (1980), vol. 43, pp. 129–136.

* cited by examiner

Primary Examiner—Robert Sellers
(74) Attorney, Agent, or Firm—Birch, Stewart, Kolasch & Birch, LLP

(57) ABSTRACT

A damping resin composition is provided which includes bifunctional diacrylate or bifunctional dimethacrylate (A) expressed by the formula (1) below, and an unsaturated polyester resin (B+C) containing an unsaturated polyester (B) and a cross-linking monomer (C), and/or an epoxy acrylate resin (B'+C) containing an epoxy acrylate (B') and a cross-linking monomer (C), wherein the bifunctional diacrylate or bifunctional dimethacrylate (A) is contained in an amount of 15 to 85% by weight, and the unsaturated polyester resin (B+C) or the epoxy acrylate resin (B'+C) or a mixture (B"+C) thereof that contains the unsaturated polyester resin (B+C) in an amount of 5 to 95% by weight and the epoxy acrylate resin (B'+C) in an amount of 95 to 5% by weight is contained in an amount of 85 to 15% by weight, the bifunctional diacrylate or bifunctional dimethacrylate (A) being expressed by:

$$CH_2=CR_2CO-(R_1O)_n-OCOCR_2=CH_2 \qquad (1)$$

where n is integer that is equal to or greater than 2, $R_1$ is an alkylene or polymethylene chain having 2 to 13 carbon atoms, and $R_2$ is hydrogen or a methyl group. Also provided is a damping resin article for a structure that is formed from the above damping resin composition by various molding methods.

8 Claims, No Drawings

DAMPING RESIN COMPOSITION AND DAMPING RESIN ARTICLE FOR STRUCTURE USING THE RESIN COMPOSITION

This application is a divisional of application Ser. No. 09/408,273, filed on Sep. 29, 1999, abandoned, the entire contents of which are hereby incorporated by reference and for which priority is claimed under 35 U.S.C. § 120.

FIELD OF THE INVENTION

The present invention relates to a damping resin composition, and a damping resin article for a structure formed from the damping resin. In particular, the present invention is concerned with a damping resin composition suitably used for forming parts surrounding the engine, for example, a rocker cover, a gear case cover, and an oil pan, and other parts, such as a noise cover, that are required to have a high damping capability, and such a damping resin article that is formed from the resin composition.

In recent years, the movements for conservation of resources and reduced pollution have been prevailing in view of global environmental protection, and, in particular, it has been strongly demanded to reduce or prevent pollution in transportation fields such as automobiles, ships, airplanes, and trains. To this end, reduction in the weight of vehicles and improvement in the fuel economy have been widely studied.

As one method of reducing the weight of a motor vehicle, for example, it has been proposed to form various components from a resin material. Resin articles posses more excellent characteristics, such as higher freedom in choice of design, lighter weight, and higher specific strength, as compared with metal articles. Among known resin compositions, FRP (Fiber Reinforced Plastic), whose strength and weight can be easily balanced with each other, has been widely used for forming outer plates, interior materials, and engine surrounding parts of automobiles, for example. In particular, parts that constitute or surround the engine are required to be light in weight, and also exhibit a high damping capability to meet with a high demand for reduced noise.

The damping characteristics of resin materials can be effectively enhanced by increasing the loss tangent (Tan δ) of dynamic distribution due to an increase in the loss elastic modulus and a reduction in the storage elastic modulus at around the glass transition temperature of the resin composition. Thus, the loss tangent (Tan δ) of the resin material has an influence on the damping characteristic thereof. Here, the loss tangent (Tan δ) is expressed as the ratio of the loss elastic modulus (E") to the storage elastic modulus (E'), i.e., Tan δ=E"/E'.

As known damping resin compositions for use in the engine, laid-open Japanese Patent Publications Nos. 3-137158 and 3-137159 disclose damping resin compositions containing nylon, or the like, as a basic material, for example.

When the damping resin compositions containing nylon as disclosed in the above-identified publications are used for forming large-sized articles, however, the articles are likely to suffer from warpage and deformation due to relatively low rigidity of the material.

In the meantime, laid-open Japanese Patent Publication No. 8-301998 discloses a damping resin composition called a sheet molding compound (hereinafter referred to as "SMC").

The SMC disclosed in the above-identified publication exhibits a good damping characteristic under a high-temperature atmosphere, causing no problem in practical use, but the damping characteristic may deteriorate under a low-temperature atmosphere upon the start of the engine, for example.

It is, therefore, an object of the present invention to provide a damping resin composition having an improved damping characteristic over a wide range of temperatures and also having an excellent molding or shaping characteristic, and a damping resin article for a structure formed from the resin composition.

SUMMARY OF THE INVENTION

To accomplish the above object, the present invention provides a damping resin composition comprising bifunctional diacrylate or bifunctional dimethacrylate (A) expressed by the formula (1) below, and an unsaturated polyester resin (B+C) consisting of unsaturated polyester (B) and a cross-linking monomer (C), wherein the component (A) is contained in an amount of 15 to 85% by weight, and the component (B+C) is contained in an amount of 85 to 15% by weight.

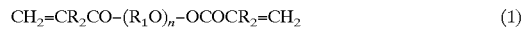

$$CH_2=CR_2CO-(R_1O)_n-OCOCR_2=CH_2 \qquad (1)$$

where n is integer equal to or greater than 2, $R_1$ is an alkylene or polymethylene chain having 2 to 13 carbon atoms, and $R_2$ is hydrogen or a methyl group.

The present invention also provides a damping resin composition comprising bifunctional diacrylate or bifunctional dimethacrylate (A) expressed by the formula (1) above, and an epoxy acrylate resin (B'+C) consisting of epoxy acrylate (B') and a cross-linking monomer (C), wherein the component (A) is contained in an amount of 15 to 85% by weight, and the component (B'+C) is contained in an amount of 85 to 15% by weight.

The present invention also provides a damping resin composition comprising bifunctional diacrylate or bifunctional dimethacrylate (A) expressed by the formula (1) above, an unsaturated polyester resin (B+C) consisting of unsaturated polyester (B) and a cross-linking monomer (C), and an epoxy acrylate resin (B'+C) consisting of epoxy acrylate (B') and a cross-linking monomer (C), wherein a component (B"+C) contains the component (B+C) in an amount of 5 to 95% by weight and the component (B'+C) in an amount of 95 to 5% by weight, and the resin composition contains the component (A) in an amount of 15 to 85% by weight and the component (B"+C) in an amount of 85 to 15% by weight.

Each of the damping resin compositions as indicated above may further contain a filler (E), a curing agent (F), a mold releasing agent (G), and a shrinkage reducing agent (H), and a thickener (I). A reinforcing material (J) composed of glass fibers, or the like, may be impregnated with the resin compound containing these agents as well as the above components (A), (B+C) and/or (B'+C), and the resulting resin composition is aged and thus formed into the shape of a sheet or a bulk. In this manner, a damping resin article for a structure is formed of the damping resin composition.

The resin composition provided according to the present invention exhibits a high damping capability over a wide range of temperatures, while assuring a good molding characteristic, and the damping resin article for a structure using this resin composition also exhibits a high damping capability.

DETAILED DESCRIPTION OF THE EMBODIMENT (INVENTION)

The damping resin composition according to the first aspect of the present invention includes bifunctional diacrylate or bifunctional dimethacrylate (A) expressed by the formula (1) below, and an unsaturated polyester resin (B+C) consisting of unsaturated polyester (B) and a cross-linking monomer (C), wherein the component (A) is contained in an amount of 15 to 85% by weight, and the component (B+C) is contained in an amount of 85 to 15% by weight.

$$CH_2=CR_2CO-(R_1O)_n-OCOCR_2=CH_2 \quad (1)$$

where n is integer equal to or greater than 2, $R_1$ is an alkylene or polymethylene chain having 2 to 13 carbon atoms, and $R_2$ is hydrogen or a methyl group.

The damping resin composition according to the second aspect of the invention includes bifunctional diacrylate or bifunctional dimethacrylate (A) expressed by the formula (1) below, and an epoxy acrylate resin (B'+C) consisting of epoxy acrylate (B') and a cross-linking monomer (C), wherein the component (A) is contained in an amount of 15 to 85% by weight, and the component (B'+C) is contained in an amount of 85 to 15% by weight.

$$CH_2=CR_2CO-(R_1O)_n-OCOCR_2=CH_2 \quad (1)$$

where n is integer equal to or greater than 2, $R_1$ is an alkylene or polymethylene chain having 2 to 13 carbon atoms, and $R_2$ is hydrogen or a methyl group.

The damping resin composition according to the third aspect of the invention includes a bifunctional diacrylate or bifunctional dimethacrylate (A) expressed by the formula (1) below, an unsaturated polyester resin (B+C) consisting of unsaturated polyester (B) and a cross-linking monomer (C), and an epoxy acrylate resin (B'+C) consisting of epoxy acrylate (B') and a cross-linking monomer (C), wherein a component (B"+C) contains the component (B+C) in an amount of 5 to 95% by weight and the component (B'+C) in an amount of 95 to 5% by weight, and the resin composition contains the component (A) in an amount of 15 to 85% by weight and the component (B"+C) in an amount of 85 to 15% by weight.

$$CH_2=CR_2CO-(R_1O)_n-OCOCR_2=CH_2 \quad (1)$$

where n is integer equal to or greater than 2, $R_1$ is an alkylene or polymethylene chain having 2 to 13 carbon atoms, and $R_2$ is hydrogen or a methyl group.

The bifunctional diacrylate or bifunctional dimethacrylate (A) expressed by the above formula (1) in which n is 2 or larger may be selected from polyethylene glycol diacrylate or dimethacrylate, polypropylene glycol diacrylate or dimethacrylate, and tripropylene diacrylate or dimethacrylate. One of these substances may be used alone, or two or more of these may be used in combination.

The unsaturated polyester (B) used in the present invention for providing the unsaturated polyester resin (B+C) may be obtained from an additional product of one selected from α, β-unsaturated dibasic acids, such as maleic acid, maleic anhydride, and fumaric acid, and acid anhydrides thereof, or saturated dibasic acids, such as phthalic acid, phthalic anhydride, isophthalic acid, terephthalic acid, adipic acid, sebacic acid, tetraphthalic anhydride, endo-methylene tetrahydrophthalic acid, and acid anhydrides thereof, and one selected from ethylene glycol, propylene glycol, diethylene glycol, 1, 3-butanediol, 1, 4-butanediol, 1, 5-pentanediol, 1, 6-hexanediol, neopentyl glycol, a hydride of bisphenol A, and propylene oxide of bisphenol A, or may be obtained from esterification of the α, β-unsaturated dibasic acid or saturated dibasic acid with polyhydric alcohol, such as glycerol, trimethylol propane, ethylene oxide, and propylene oxide.

In addition, dicyclopentadiene, or an adduct of cyclopentadiene and maleic acid may be used as a material.

The unsaturated polyester (B) is dissolved into a cross-linking monomer (C), to provide an unsaturated polyester resin (B+C).

The epoxy acrylate (B") used in another aspect of the present invention for providing the epoxy acrylate resin is a compound having at least two epoxy groups in one molecule, and may be selected from epoxy compounds, such as diglycidyl ether type epoxy resins having, as a main skeleton, a bisphenol compound exemplified by bisphenol A, bisphenol F or bromized bisphenol A, polyglicidyl ether type epoxy resins having, as a main skeleton, a polynuclear phenol exemplified by phenol, cresol novolak, or bromized phenol novolak, and polyglicidyl ether type epoxy resins having, as a main skeleton, an organic polybasic acid exemplified by dimer acid or trimellitic acid. One of these epoxy compounds may be used alone, or two or more of these compounds may be used in combination.

The epoxy acrylate may also obtained by reacting the above-indicated epoxy compound with an unsaturated monobasic acid, and further with a polybasic anhydride, so that the acid is contained as a pendant in each molecule.

The unsaturated monobasic acid may be selected from acrylic acid, methacrylate acid, crotonic acid, and sorbic acid. One of these acids may be used alone, or two or more of these acids may be used in combination.

The polybasic anhydride may be selected from maleic anhydride, phthalic anhydride, itaconic anhydride, citraconic anhydride, tetrahydrophthalic anhydride, tetrabromophthalic anhydride, trimellitic anhydride, and 3, 6-endomethylene 1, 2, 3, 6-tetrahydro-cis-phthalic anhydride.

The epoxy acrylate (B') is dissolved into a cross-linking monomer (C), to provide an epoxy acrylate resin (B'+C).

The cross-linking monomer (C) used in the present invention may be selected from vinyl monomers or vinyl oligomers that may be cross-linked with an unsaturated polyester and include vinyl compounds, such as styrene, vinyltoluene, α-methylstyrene, chlorostyrene, dichlorostyrene, vinylnaphthalene, ethyl vinyl ether, methyl vinyl ketone, methyl acrylate, methyl methacrylate, acrylonitrile, and methacrylonitrile, and allyl compounds such as diallyl phthalate, diallyl fumarate, diallyl succinate and triallyl cyanurate. While a selected one of these monomers may be used alone, or a combination of two or more monomers may be used, styrene is preferably used.

The damping resin composition of the present invention is obtained by mixing the bifunctional diacrylate or bifunctional dimethacrylate (A) expressed by the formula (1) above wherein n is 2 or larger, with the unsaturated polyester resin (B+C) or epoxy acrylate resin (B'+C), such that the ratio of the component (A) to the component (B+C) or (B'+C) is in the range of 15–85%/85–15% by weight.

The damping resin composition of the present invention is also obtained by mixing the bifunctional diacrylate or bifunctional dimethacrylate (A) expressed by the formula (1) above wherein n is 2 or larger, with the unsaturated polyester resin (B+C) and the epoxy acrylate resin (B'+C), such that the ratio of the component (A) to a component (B"+C) as a combination of the components (B+C) and (B'+C), i.e., (A)/[(B+C)+(B'+C)], is in the range of 15–85%/85–15% by weight, where the component (B"+C) is obtained by mixing the component (B'+C) in an amount of 95 to 5% by weight with the component (B+C) in an amount of 5 to 95% by weight.

With the components mixed in the above proportions, the resulting resin composition has a high damping capability over a wide temperature range, and also exhibits an excellent molding characteristic and a high heat resistance.

If the content of the component (A) is less than 15% by weight, the resulting resin composition does not effectively perform its damping function. If the content of the component (A) exceeds 85% by weight, on the other hand, the heat resistance of a resin article formed from the resin composition is undesirably reduced. Accordingly, the component (A) is contained in an amount of 15 to 85% by weight, while the component (B+C), (B'+C) and/or (B"+C) is contained in an amount of 85 to 15% by weight.

The damping resin composition as described above further contains a filler (E), a curing agent (F), a mold releasing agent (G), and a shrinkage reducing agent (H), and a thickener (I). A reinforcing material (J) is impregnated with the resin compound containing these agents as well as the components (A) and (B+C) and/or (B'+C), and the resulting resin composition is aged and thus formed into the shape of a sheet or a bulk.

The filler (E) may be selected from calcium carbonate, aluminum hydroxide, talc, clay, barium sulfate, alumina, silica sand, silica powder, glass beads, glass powder, glass balloon, and crystalline limestone (kansuiseki). While calcium carbonate is generally used, a flake-like filler is effective to improve the damping characteristic, and therefore a conventional flake-like inorganic substance, such as mica or flake-like graphite, may also be used. The content of the filler (E) is not limited to a particular range, but is preferably held in the range of 0.2 to 1% weight, for example.

The curing agent (F) may be selected from organic peroxides, such as benzoyl peroxide, methyl ethyl ketone peroxide, peroxyperbenzoate, cumene hydroperoxide, tert-butyl perbenzoate, peroxyketal, and dicumyl peroxide. The content of the curing agent (F) is not limited to a particular range, but is preferably in the range of 0.2 to 1% by weight, for example.

The mold releasing agent (G) may be selected from conventional internal mold releasing agents, including higher fatty acids or higher fatty acid esters, such as stearic acid and metallic salts thereof, alkyl phosphate, and carnauba wax. The content of the mold releasing agent (G) is not limited to a particular range, but is preferably in the range of 0.7 to 2% by weight, for example.

The shrinkage reducing agent (H) may be selected from polystyrene, polyvinyl acetate, polyethylene, polypropylene, polymethylmethacrylate, styrenebutadiene, block copolymer, and saturated polyester. The content of the shrinkage reducing agent (H) is not particularly limited, but is preferably in the range of 0 to 15% by weight, for example.

The thicker (I) is chemically combined with a hydroxyl group, carboxyl group or ester bond of unsaturated polyester or epoxy acrylate, to produce a linear or partial cross-linking thereby to increase the molecular weight, so that the viscosity of the unsaturated polyester resin or epoxy acrylate resin is increased. For example, the thickener (I) may be selected from diisocyanates such as toluene diisocyanate, polycyanate compounds, metal alkoxides, such as aluminum isopropoxide and titanium tetrabutoxide, oxides of bivalent metals, such as magnesium oxide, calcium oxide, and beryllium oxide, and hydroxides of bivalent metals, such as calcium hydroxide. The content of the thickener (I) is not particularly limited, but is preferably in the range of 0.05 to 1.0% by weight.

The reinforcing material (J) may be selected from glass fibers, vinylon fibers, polyester fibers, phenol fibers, and carbon fibers. Among these, glass fibers are generally used.

The reinforcing material is not limited to a particular shape, but generally has a length of 3 to 50 mm, for example. A chopped mat or a fabric-like fiber may also be used.

The reinforcing material (J) is generally added in an amount of 0 to 60% be weight with respect to the whole weight of the resin composition. In particular, the length of the fibers is preferably in the range of 6–25 mm, and the content thereof is preferably in the range of 5 to 40% by weight.

Various damping resin articles for structures can be manufactured using the damping resin composition of the present invention as described above.

To form a damping resin article from the damping resin composition of the present invention, various molding methods may be employed which include hot pressing for processing SMC as described above, BMC (bulk molding compound), and the like, injection molding, brushing for applying the resin composition to a mold, a hand layup method that uses a roller, or the like, to carry out lamination, a spray up method in which a reinforcing material such as glass chops and the resin composition are sprayed from at tip of a nozzle into a mold, using an air pressure, to carry out lamination, cast molding in which the resin composition is poured into a mold, a matched metal die method in which reinforcing fibers are set in advance in a mold, and the resin composition is poured into the mold and thus shaped, RIM (resin transfer molding), RIM (reaction injection molding), and so forth.

The resin articles of the present invention, formed by the above-indicated molding methods, may be widely used as, for example, engine surrounding parts, such as a rocker cover, a gear case cover, and an oil pan, and other parts, such as a noise cover, that are required to provide a sufficiently high damping capability.

In the following, specific examples of the present invention and comparative examples will be described, in which some chemical substances are abbreviated as follows:

IPA: isophthalic acid PG: propylene glycol MAn: maleic anhydride

SM: styrene monomer HQ: hydroquinone TBPB: t-butylperbenzoate

MgO: trade name "KYOWAMAG 40" manufactured by Kyowa Chemical Industry Co., Ltd.

$CaCO_3$: trade name "NS200" manufactured by Nitto Funka Kogyo K.K.

PS: SM solution containing 60% by weight of polystyrene having a number average molecular weight of 100,000

PVAc: SM solution having 35% by weight of polyvinyl acetate, trade name "M-5D" manufactured by Denki Kagaku Kogyo Kabushiki Kaisha Zn-St: zinc stearate, trade name "SZ-2000" manufactured by Sakai Chemical Industry Co., Ltd.

In the following description, "part" means "part by weight" unless otherwise specified.

SYNTHESIS EXAMPLE 1

Synthesis of Unsaturated Polyester Resin

Initially, 1012 g of IPA and 2003 g of PG were introduced into a reactor equipped with an agitator, a thermometer, a nitrogen gas inlet tube, a partial condenser with a thermometer provided at a top part thereof, and a whole condenser, and the content of the reactor started being stirred and heated with nitrogen gas flowing into the reactor. Thereafter, the temperature was gradually elevated, and dehydration and condensation reactions were caused to take place with the reactor kept at the highest temperature of 210° C. At the point of time when the acid value of the reaction mixture became equal to 10, heating was stopped, and the mixture was coded down to 120° C. After 1793 g of MAn was then introduced into the reactor, heating was started again, and dehydration and condensation reactions were caused to take place at the highest temperature of 210° C. to obtain an unsaturated polyester having an acid value of 15. Thereafter, the unsaturated polyester was cooled down to 170° C., and 0.5 g of HQ was added and mixed well with the polyester. The unsaturated polyester thus obtained was then dissolved into SM, to provide an unsaturated polyester resin (UP1) containing 30% by weight of SM.

SYNTHESIS EXAMPLE 2

Synthesis of Epoxy Acrylate Resin 1

525 g of EPIKOTE 1001 (epoxy resin manufactured by Yuka Shell Epoxy K.K.), 91 g of methacrylic acid, 0.5 g of hydroquinone, 1.5 g of trimethylaminodimethylphenol, and 350 g of styrene monomer were introduced into a reactor equipped with an agitator, a thermometer, and a cooler, then heated to 120° C. for reaction thereof, and cooled down with the acid value being equal to or less than 10 to obtain an epoxy acrylate resin (EA1).

SYNTHESIS EXAMPLE 3

Synthesis of Epoxy Acrylate Resin 3

Synthesis was conducted in the same manner as in Synthesis Example 2, and 33 g of maleic anhydride was added with the acid value being equal to or less than 10, and reacted with the other ingredients at 100° C. for one hour until the acid value became equal to or less than 40 to obtain epoxy acrylate resin (EA2).

SYNTHESIS EXAMPLE 4

Synthesis of Epoxy Acrylate Resin 3

488 g of EPIKOTE 154 (epoxy resin manufactured by Yuka Shell Epoxy K.K.). 115 g of methacrylic acid, 0.5 g of hydroquinone, 1.5 g of trimethylaminodimethylphenol, and 350 g of styrene monomer were introduced into a reactor equipped with an agitator, a thermometer, and a cooler, then heated to 120° C. for reaction thereof, and 47 g of maleic anhydride was added with the acid value being equal to or less than 15, to be reacted with the other ingredients at 100° C. for one hour until the acid value became equal to or less than 40 to obtain epoxy acrylate resin (EA3).

EXAMPLE 1

Initially, 35 parts of polyethylene glycol diacrylate (PEDGA) (n=4), 140 parts of $CaCO_3$, 1 part of TBPB, 4 parts of Xn-St, 30 parts of PVAc, and 1 part of MgO was mixed through stirring with the unsaturated polyester (UP1) obtained in Synthesis Example 1 as described above. The proportions of these substances are indicated in TABLE 1. Then, the mixture was continuously supplied onto a polyethylene sheet by a SMC manufacturing machine, to thus provide a SMC containing 30% by weight of glass fibers and having a thickness of 2 mm. To prevent vaporization of the styrene monomer in the SMC, the compound is wrapped with a cellophane film, and aged at 40° C. for 40 hours in an aging furnace. After the aging step, the polyethylene sheet was peeled off. In this manner, a SMC was provided which had no adhesiveness and with which the glass fibers were favorably impregnated.

Subsequently, the SMC was subjected to press molding at a pressure of 60 kg/cm$^2$ for four minutes, within a flat plate metal mold and a metal mold having ribbed bosses that were heated to 140° C. to provide a damping resin article.

TABLE 1

|  | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Com. Ex.1 | Com. Ex.2 |
|---|---|---|---|---|---|---|---|---|---|---|---|---|---|
| UP | 35 | 35 | 49 | 56 | 35 | 35 | 35 | — | — | — | — | 70 | 70 |
| EA2 | — | — | — | — | — | — | — | 35 | 35 | — | — | — | — |
| EA3 | — | — | — | — | — | — | — | — | — | 35 | 35 | — | — |
| PEGDA-1 | 35 | — | — | — | — | 35 | — | 35 | — | 35 | — | — | — |
| PEGDA-2 | — | 35 | 21 | 14 | — | — | 35 | — | 35 | — | 35 | — | — |
| PEGDA-3 | — | — | — | — | 35 | — | — | — | — | — | — | — | — |
| CaCO$_3$ | 140 | 140 | 140 | 140 | 140 | 140 | 140 | 140 | 140 | 140 | 140 | 140 | 140 |
| TBPB | 1 | 1 | 1 | 1 | 1 | 1 | 1 | 1 | 1 | 1 | 1 | 1 | 1 |
| Zn-St | 4 | 4 | 4 | 4 | 4 | 4 | 4 | 4 | 4 | 4 | 4 | 4 | 4 |
| PS | — | — | — | — | — | — | — | 30 | — | — | — | 30 | — |
| PVAc | 30 | 30 | 30 | 30 | 30 | 30 | 30 | — | 30 | 30 | 30 | — | 30 |
| MgO | 1 | 1 | 1 | 1 | 1 | 1 | 1 | 1 | 1 | 1 | 1 | 1 | 1 |

PEGDA-1 polyethylene glycol acrylate with n = 4
PEGDA-2 polyethylene glycol acrylate with n = 6
PEGDA-3 polyethylene glycol acrylate with n = 13

EXAMPLES 2–7

A sheet molding compound (SMC) was produced in the same manner as in Example 1, except that each of the materials was mixed to the compound according to the proportion, as indicated in TABLE 1, to provide a damping resin article of each of Examples 2–7.

EXAMPLE 8

A sheet molding compound (SMC) was produced in the same manner as in Example 1 according to the proportions as indicated in TABLE 1, except that the unsaturated polyester resin was replaced by the epoxy acrylate resin 2 (EA2) obtained in Synthesis Example 2, as described above, to provide a damping resin article.

EXAMPLES 9–11

A sheet molding compound (SMC) was produced in the same manner as in Example 8, except that each of the materials of the compound was mixed into the compound, according to the proportion as indicated in TABLE 1, to provide a damping resin article.

COMPARATIVE EXAMPLES 1–2

A sheet molding compound (SMC) was produced in the same manner as in Example 1, except that each of the materials of the compound was mixed into the compound, according to the proportion as indicated in TABLE 1, to provide a damping resin article.

Each resin article in the form of a flat plate or sheet obtained in Examples 1–11 and Comparative Examples 1–2 was cut into the size of 25 cm×2.5 cm, and its damping characteristic was evaluated by measured the loss factor η by a center-supported steady-state vibration method according to JIS G 0602 "Method for Testing Vibration Damping Characteristic of Damping Steel Plate". The loss factor η is proportional to the value of Tan δ that is increased with an increase in the loss elastic modulus and a reduction in the storage elastic modulus during glass transition of the material, and the damping characteristic is improved with an increase in the loss factor η. The relationship between the loss factor η and the temperature is indicated in TABLE 2.

TABLE 2

|  | 20° C. | 40° C. | 60° C. | 80° C. | 100° C. | 120° C. |
|---|---|---|---|---|---|---|
| Ex. 1 | 0.014 | 0.021 | 0.049 | 0.033 | 0.038 | 0.052 |
| Ex. 2 | 0.010 | 0.017 | 0.054 | 0.052 | 0.054 | 0.058 |
| Ex. 3 | 0.010 | 0.016 | 0.046 | 0.051 | 0.060 | 0.048 |
| Ex. 4 | 0.010 | 0.015 | 0.043 | 0.050 | 0.058 | 0.045 |
| Ex. 5 | 0.018 | 0.048 | 0.065 | 0.051 | 0.047 | 0.046 |
| Ex. 6 | 0.009 | 0.015 | 0.043 | 0.034 | 0.035 | 0.050 |
| Ex. 7 | 0.023 | 0.043 | 0.068 | 0.044 | 0.035 | 0.034 |
| Ex. 8 | 0.008 | 0.015 | 0.060 | 0.042 | 0.105 | 0.090 |
| Ex. 9 | 0.013 | 0.027 | 0.060 | 0.051 | 0.122 | 0.090 |
| Ex. 10 | 0.011 | 0.027 | 0.060 | 0.040 | 0.076 | 0.096 |
| Ex. 11 | 0.012 | 0.025 | 0.092 | 0.079 | 0.082 | 0.075 |
| Com.Ex. 1 | 0.009 | 0.009 | 0.020 | 0.020 | 0.023 | 0.023 |
| Com.Ex. 2 | 0.009 | 0.016 | 0.041 | 0.027 | 0.025 | 0.030 |

It will be understood from data shown in TABLE 2 that the damping resin compositions and damping articles of the present invention show high loss factor values over a wide temperature range, as compared with Comparative Examples 1–2, and thus exhibit improved damping characteristics.

It follows that the present invention provides a damping resin composition having an improved damping characteristic over a wide range of temperatures while assuring a good molding characteristic, and a damping article for a structure formed from the damping resin composition and having an improved damping characteristic.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims:

1. A vibration damping resin composition for a molded product, comprising:

bifunctional diacrylate or bifunctional dimethacrylate (A), and an epoxy acrylate resin (B'+C) comprising an epoxy acrylate (B') and with a styrene cross-linking monomer (C), wherein the bifunctional diacrylate or bifunctional dimethacrylate (A) is contained in an amount of 15 to 85% by weight, and the epoxy acrylate resin (B'+C) is contained in an amount of 85 to 15% by weight, the bifunctional diacrylate or bifunctional dimethacrylate (A) being expressed by:

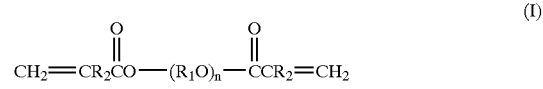

(I)

wherein n is an integer that is equal to or greater than 2, $R_1$ is an alkylene or polymethylene chain having 2 to 13 carbon atoms, and $R_2$ is hydrogen or a methyl group, an organic peroxide curing agent, and a filler (E) in an amount of from 0.2–1 wt % based on the weight of the vibration damping resin composition.

2. The vibration damping resin composition for a molded product of claim 1, wherein the composition further comprises a filler (E).

3. The vibration damping resin composition for a molded product of claim 2, wherein the composition further comprises a mold releasing agent (G).

4. The vibration damping resin composition for a molded product of claim 3, wherein the composition further comprises a shrinkage reducing agent (H).

5. The vibration damping resin composition for a molded product of claim 4, wherein the composition further comprises a thickener (I) to provide a resin compound with which a reinforcing material (J) is impregnated, said resin compound being aged and formed into the shape of a sheet or a bulk.

6. The vibration damping resin composition for a molded product of claim 4, wherein said reinforcing material (J) comprises glass fibers.

7. The vibration damping resin composition for a molded product, prepared by combining:

bifunctional diacrylate or bifunctional dimethacrylate (A), and an epoxy acrylate resin (B'+C) comprising an epoxy acrylate (B') and with a styrene cross-linking monomer (C), wherein the bifunctional diacrylate or bifunctional dimethacrylate (A) is contained in an amount of 15 to 85% by weight, and the epoxy acrylate resin (B'+C) is contained in an amount of 85 to 15% by weight, the bifunctional diacrylate or bifunctional dimethacrylate (A) being expressed by:

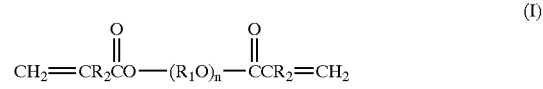

(I)

where n is an integer that is equal to or greater than 2, $R_1$ is an alkylene or polymethylene chain having 2 to 13 carbon atoms, and $R_2$ is hydrogen or a methyl group, an organic peroxide curing agent, a filler (E), in an amount of from 0.2–1 wt % based on the weight of the vibration damping resin composition;

a mold releasing agent (G), a shrinkage reducing agent (H), a thickener (I) to provide a resin composition with which a reinforcing material (J) is impregnated, said resin composition being aged and formed into the shape of a sheet or a bulk, and wherein said reinforcing material (J) comprises glass fibers.

8. The vibration damping resin composition for a molded product of claim 7, wherein the mold releasing agent (G) is in a concentration of 0.7–2 wt %, the shrinkage reducing agent (H) is in a concentration of 0–15 wt %, the thickener (I) is in a concentration of 0.05–1.0 wt %, and the reinforcing material (J) is in a concentration of 5–60 wt %, wherein all wt % values are based on the weight of the vibration damping resin composition.

* * * * *